(12) United States Patent
Blomberg et al.

(10) Patent No.: US 12,482,032 B2
(45) Date of Patent: Nov. 25, 2025

(54) SELECTIVE DATA REJECTION FOR COMPUTATIONALLY EFFICIENT DISTRIBUTED ANALYTICS PLATFORM

(71) Applicant: TD Ameritrade IP Company, Inc., Omaha, NE (US)

(72) Inventors: Aaron Andrew Blomberg, Bennington, NE (US); Mitchel William Weiler, Omaha, NE (US); Alexander Conrad Ockenden, Omaha, NE (US); Curtis Joseph Beeson, Bennington, NE (US)

(73) Assignee: CHARLES SCHWAB & CO., INC., San Francisco, CA (US)

( * ) Notice: Subject to any disclaimer, the term of this patent is extended or adjusted under 35 U.S.C. 154(b) by 353 days.

(21) Appl. No.: 16/872,322

(22) Filed: May 11, 2020

(65) Prior Publication Data
US 2020/0410296 A1    Dec. 31, 2020

Related U.S. Application Data

(63) Continuation-in-part of application No. 16/458,148, filed on Jun. 30, 2019, now abandoned.

(51) Int. Cl.
| | |
|---|---|
| G06Q 30/0601 | (2023.01) |
| G06F 3/0482 | (2013.01) |
| G06F 18/21 | (2023.01) |
| G06F 18/214 | (2023.01) |
| G06F 18/22 | (2023.01) |
| G06N 5/025 | (2023.01) |

(52) U.S. Cl.
CPC ....... *G06Q 30/0641* (2013.01); *G06F 3/0482* (2013.01); *G06F 18/214* (2023.01); *G06F 18/217* (2023.01); *G06F 18/22* (2023.01); *G06N 5/025* (2013.01)

(58) Field of Classification Search
CPC .......... G06N 5/025; G06N 20/20; G06N 5/04; G06N 5/045
See application file for complete search history.

(56) References Cited

U.S. PATENT DOCUMENTS

| | | | | |
|---|---|---|---|---|
| 8,621,420 | B2 * | 12/2013 | Brown | G06F 8/10 |
| | | | | 717/104 |
| 9,165,270 | B2 * | 10/2015 | Dickinson | G06Q 10/063 |
| 9,449,259 | B1 * | 9/2016 | Cheng | G06F 18/21 |

(Continued)

*Primary Examiner* — Abdullah Al Kawsar
*Assistant Examiner* — Tewodros E Mengistu
(74) *Attorney, Agent, or Firm* — Harness, Dickey & Pierce, P.L.C.

(57) ABSTRACT

A model management system for validating models for predicting a client behavior event includes a model validation system configured to execute each of multiple stages of a selected model, which includes calculating a respective output based on a respective input of each of the stages. The model validation system is configured to separately verify, based on the respective outputs, each of the stages. The model validation system is configured to generate and store model data corresponding to the respective outputs of each of the stages. The model data includes a first set of model data and a second set of model data different from the first set of model data. A user interface module is configured to receive an indication of credentials of a user and selectively retrieve and display one of the first set of model data and the second set of model data based on the indication.

16 Claims, 10 Drawing Sheets

(56) References Cited

U.S. PATENT DOCUMENTS

| | | | |
|---|---|---|---|
| 11,119,630 B1* | 9/2021 | Marchetti | G06N 5/04 |
| 11,170,309 B1* | 11/2021 | Stefani | G06N 20/20 |
| 11,537,506 B1* | 12/2022 | Dasgupta | G06N 3/10 |
| 2003/0014378 A1* | 1/2003 | Goodnight | G06N 3/045 |
| | | | 706/26 |
| 2003/0217021 A1* | 11/2003 | Jacobson | F02D 41/1405 |
| | | | 701/99 |
| 2009/0106178 A1* | 4/2009 | Chu | G06N 20/00 |
| | | | 706/14 |
| 2017/0220943 A1* | 8/2017 | Duncan | G06N 5/04 |
| 2018/0150770 A1* | 5/2018 | Shaoib | G06N 20/00 |
| 2018/0268258 A1* | 9/2018 | Tapia | G06F 18/217 |
| 2019/0228336 A1* | 7/2019 | Kanagawa | G06N 5/02 |
| 2020/0012962 A1* | 1/2020 | Dent | G06F 9/5011 |
| 2020/0051550 A1* | 2/2020 | Baker | G06N 20/20 |
| 2020/0073755 A1* | 3/2020 | Strachan | G06F 11/1048 |
| 2020/0311613 A1* | 10/2020 | Ma | G06N 3/084 |

\* cited by examiner

SELECTIVE DATA REJECTION FOR COMPUTATIONALLY EFFICIENT DISTRIBUTED ANALYTICS PLATFORM

CROSS-REFERENCE TO RELATED APPLICATIONS

This application is a continuation-in-part of U.S. patent application Ser. No. 16/458,148, filed on Jun. 30, 2019. The entire disclosure of the application referenced above is incorporated herein by reference.

FIELD

The present disclosure relates to computerized analytics systems and more particularly to computerized analytics systems using machine learning models.

BACKGROUND

Computerized investment systems (e.g., online or electronic trading systems) provide various services to clients to facilitate the trading of investment products such as shares of stocks. The financial investment systems may monitor, collect, and store data client data including, but not limited to, transactional data (e.g., data about trades conducted by respective clients) and data indicative of client behavior.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A model management system for validating models for predicting a client behavior event includes a model validation system configured to execute each of a plurality of stages of a selected model, including calculating a respective output based on a respective input of each of the plurality of stages, separately verify, based on the respective outputs, each of the plurality of stages, and generate and store model data corresponding to the respective outputs of each of the plurality of stages. The model data includes a first set of model data and a second set of model data different from the first set of model data. A user interface module is configured to receive an indication of credentials of a user and selectively retrieve and display one of the first set of model data and the second set of model data based on the indication.

In other features, to verify each of the plurality of stages, the model validation system is configured to compare the respective outputs to one of a corresponding threshold and a range of values. The model management system is configured to generate and transmit a notification in response to the comparison. The notification identifies a variable used in a respective one of the plurality of stages. The model management system is configured to selectively stop executing the plurality of stages of the selected model based on the comparison. The first set of model data is accessible, via the user interface module, to a first set of users and the second set of model data is accessible, via the user interface module, to a second set of users. The second set of data is a subset of the first set of data.

In other features, the model validation system is configured to store output tables including data indicative of the respective outputs of each of the plurality of stages. The model validation system is configured to generate the model data using the data in the output tables. The model data includes a visual representation of the data in the output tables. The user interface module is configured to selectively display one of a model performance interface accessible by a first set of users and a storefront interface accessible by a second set of users.

A method for validating models for predicting a client behavior event includes executing each of a plurality of stages of a selected model, including calculating a respective output based on a respective input of each of the plurality of stages, separately verifying, based on the respective outputs, each of the plurality of stages, and generating and storing model data corresponding to the respective outputs of each of the plurality of stages. The model data includes a first set of model data and a second set of model data different from the first set of model data. The method further includes receiving an indication of credentials of a user and selectively retrieving and displaying one of the first set of model data and the second set of model data based on the indication.

In other features, the method further includes verifying each of the plurality of stages includes comparing the respective outputs to one of a corresponding threshold and a range of values. The method further includes generating and transmitting a notification in response to the comparison. The notification identifies a variable used in a respective one of the plurality of stages. The method further includes selectively stopping the executing of the plurality of stages of the selected model based on the comparison. The first set of model data is accessible, via a user interface module, to a first set of users and the second set of model data is accessible, via a user interface module, to a second set of users. The second set of data is a subset of the first set of data.

In other features, the method further includes storing output tables including data indicative of the respective outputs of each of the plurality of stages. The method further includes generating the model data using the data in the output tables. The model data includes a visual representation of the data in the output tables. The method further includes selectively displaying one of a model performance interface accessible by a first set of users and a storefront interface accessible by a second set of users.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

In a financial investment system, client data may include data indicative of client behavior and, in some examples, the client data may be analyzed to predict future behavior. For example, the client data may be analyzed to predict client retention and attrition (i.e., the client data may be used to determine a likelihood that a particular client will terminate or continue using the financial investment system).

In some examples, the financial investment system may implement various models to analyze the client data and output predictive data regarding client behavior. However, the large amount of client data available reduces the accuracy of the outputs of the models. For example only, for a single client, the client data may include thousands of tables, tens of thousands of variables, and millions of data points. It may be difficult to reduce such a large amount of data to specific data points that are relevant to particular behaviors or events (e.g. a "behavior event"). For example, transactional data alone may not be directly correlated to future behavior events.

Model development and validation systems and methods according to the present disclosure are configured to identify which data (e.g., variables) and models are most relevant to various client behavior events and update the models according to actual results. For example, models and various processes are applied to raw client data to identify the most significant variables for a particular client behavior event (e.g., client retention or attrition behavior) to reduce the amount of client data that is used in subsequent modeling. For example only, thousands of variables (e.g., 6000) for predicting a particular behavior event may be reduced to hundreds (e.g., 100) of variables, and these selected variables are then used in models configured to predict the behavior event. The models and/or variables may be selected based on whether a predicted likelihood (i.e., rate) for the behavior event for a particular client is greater than a natural rate of the behavior event (i.e., a rate at which the behavior event actually occurs amongst a large sample of clients, such as all current and/or previous clients).

A model validation system according to the present disclosure is further configured to dynamically score and validate models, including validation of specific variables at multiple stages of each model. A model management system facilitates interaction with models and related validation data. For example, the model management system implements a user interface that provides access to the models and validation data including, but not limited to, model inputs, outputs, variables, scores, anomalies, etc.

Figure 1:
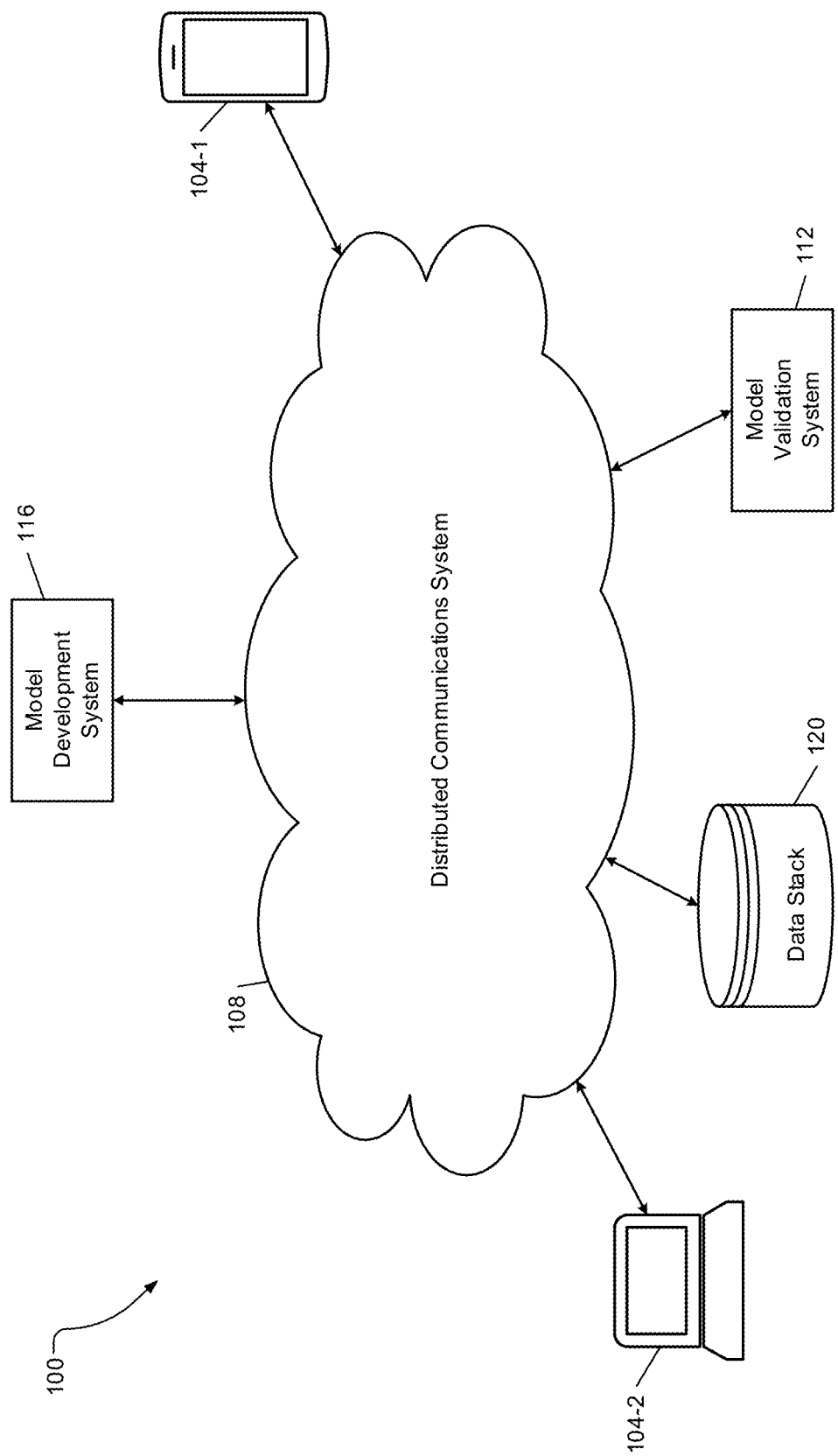
FIG. 1 is a block diagram of an example system configured to develop and validate models for predicting client behavior according to the principles of the present disclosure.

FIG. 1 is an example system 100 configured to develop and validate models for predicting client behavior according to the principles of the present disclosure. One or more user devices—for example, a first user device 104-1, a second user device 104-2, etc. (collectively, user devices 104)—may be used to access a model development system 108, a model validation system 112, and a data stack 116 via a distributed communication system (DCS) 120, such as the Internet, a cloud computing system, etc., and a respective user interface. For example, the user devices 104 may include a smartphone or other mobile device as shown at 104-1, a mobile or desktop computing device as shown at 104-2, etc. Although shown separately, in some examples the model development system 108 and the model validation system 112 may be implemented within a same computing device, server, components of a cloud computing system, etc.

The user devices 104 may be configured to provide access to and, in some examples, execute model development software. For example, the model development software may be stored in and/or executed by the model development system 108 and be accessible via the DCS 120, allowing users to remotely access the model development software using the user devices 104. In some examples, the user devices 104 execute respective user interfaces configured to interact with the model development software, receive inputs, display results, etc., while the model development system 108 executes the model development software. In other examples, the user devices 104 may be configured to store and/or retrieve portions of the model development software to be executed on the user devices 104.

The model validation system 112 is configured to validate the models developed by the model development system 108. For example, the user devices 104 may be configured to provide access to the model validation system 112 to select from among and run (i.e., execute) available models to validate results of the models. For example, selected models are executed to determine whether respective predicted likelihoods (i.e., rates) for a behavior event using the models are greater than a natural rate of the behavior event. A ratio of the predicted likelihood to the natural rate may be referred to a "lift" of the model (e.g., a target response divided by the average response). Models having a lift above a desired threshold (e.g., 1.2) may be retained and implemented (i.e., as production models) while models having a lift below the desired threshold may be discarded and/or adjusted.

The data stack 116 stores data including, but not limited to, raw client data, the models (including model files for both production models and models under development), model development and validation software, etc. The data stored in the data stack 116 may be accessed and retrieved by the model development system 108, the model validation system 112, and the user devices 104 to develop, validate, and run the models. The data stack 116 may correspond to storage and/or memory devices in a single or multiple locations, such as one or more servers, a cloud computing system, databases or data warehouse appliances, etc.

Figure 2:
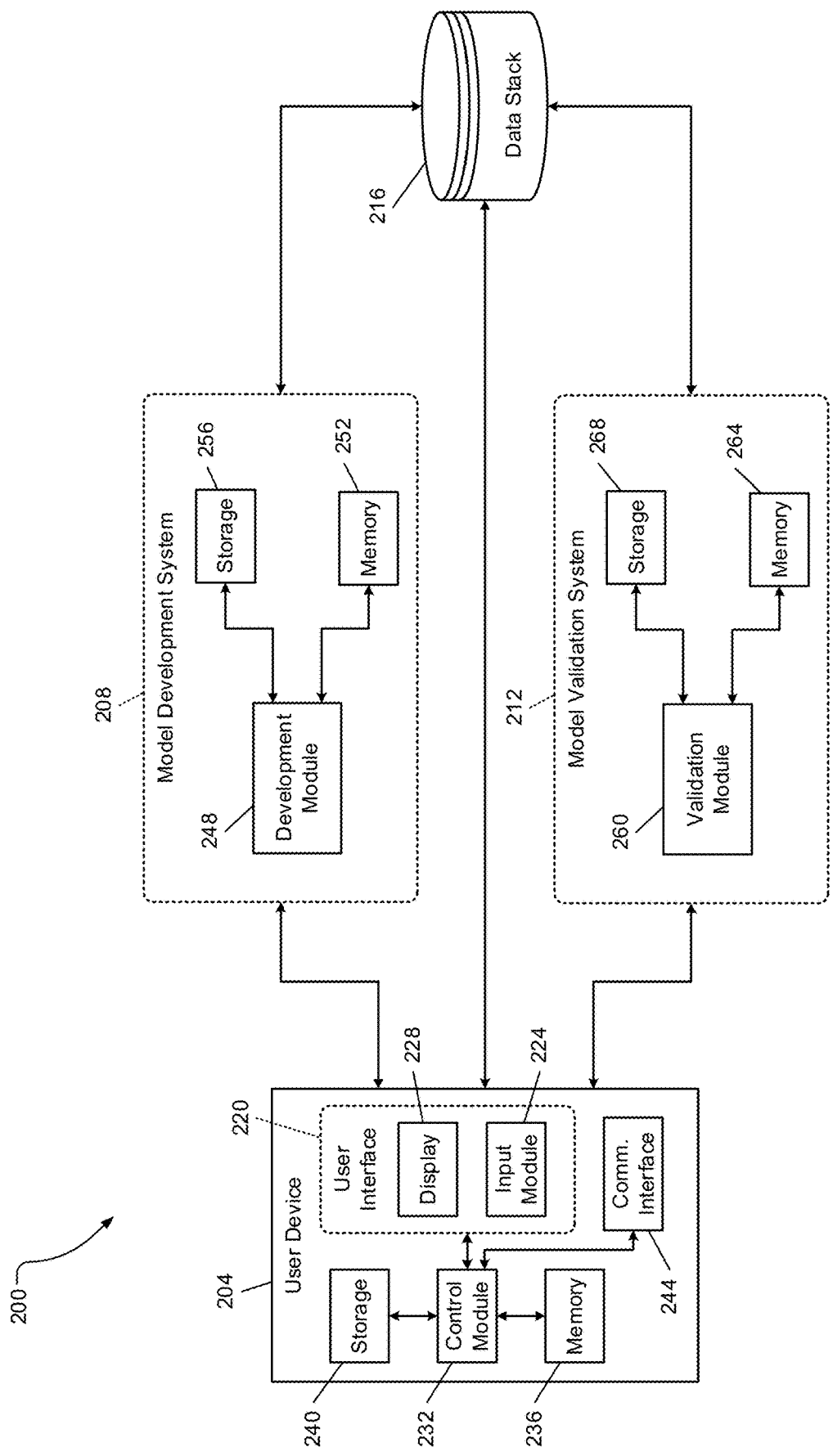
FIG. 2 is a block diagram of an example implementation of a system including a model development system and a model validation system according to the principles of the present disclosure.

FIG. 2 shows an example implementation of a system 200 including a user device 204, model development system 208, model validation system 212, and data stack 216 configured to develop and validate models for predicting client behavior according to the principles of the present disclosure. For simplicity, the DCS 120 of FIG. 1 is not shown. The user device 204 implements a user interface 220 configured to receive inputs from and display information to a user. For example, the user interface 220 includes an input module 224 configured to receive inputs entered via a touchscreen and/or buttons, a physical or virtual keyboard, voice commands, etc. Conversely, the user interface 220 includes a display 228 configured to display information to the user. In some examples, the user interface 220 corresponds to a touchscreen configured to both receive inputs and display information and images.

The user device 204 includes a control module 232 configured to control functions of the user device 204, including, but not limited to, implementing the user interface 220. For example, the control module 232 may correspond to a processor configured to execute software instructions stored in memory 236 and/or high-capacity storage 240. In various implementations, the software instructions may be loaded into memory 236 from the high-capacity storage 240 and executed solely from within memory 236.

The control module 232 may be further configured to execute model development software (e.g., all or portions of model development software implemented by the model development system 208 and/or stored within the data stack 216) and run and validate models (e.g., using the model validation system 212, models, files, and client data stored in the data stack 216, etc.). The user device 204 communicates with the model development system 208, the model validation system 212, and the data stack 216 via a communication interface 244 (e.g., a wireless communication interface, a cellular communication interface, etc.). The model development system 208, the model validation system 212, and/or the data stack 216 may implement corresponding communication interfaces (not shown).

The model development system 208 includes a development module 248 configured to control functions of the model development system 208, including, but not limited to, communicating with the user device 204 and the data stack 216 to facilitate model development. For example, the development module 248 may correspond to a processor configured to execute software instructions stored in memory 252 and/or high capacity storage 256 and access data stored in the data stack 216, including, but not limited to, raw client data, stored production and development models, model development software, etc.

The development module 248 may correspond to a processing server, service controller, etc. and may be configured to implement an application programming interface (API) for model development accessible by the user device 204. For example, the development module 248 may be responsive to inputs received from the user device 204. Conversely, the model development system 208 provides information to be displayed on the user device 204. In this manner, one or more users may use respective user devices 204 to access the model development system 208 to develop models as described below in more detail.

The model validation system 212 includes a validation module 260 configured to control functions of the model validation system 212, including, but not limited to, communicating with the user device 204 and the data stack 216 to facilitate model validation. For example, the validation module 260 may correspond to a processor configured to execute software instructions stored in memory 264 and/or high capacity storage 268 and access data stored in the data stack 216, including, but not limited to, raw client data, stored production and development models, model validation software, etc. Although shown separately, the model validation system 212 may be implemented within a same computing device, server, components of a cloud computing system, etc. as the model development system 208.

The validation module 260 may be responsive to inputs received from the user device 204. Conversely, the model validation system 212 provides information to be displayed on the user device 204. In this manner, one or more users may use respective user devices 204 to access the model validation system 212 to validate models as described below in more detail.

Figure 3:
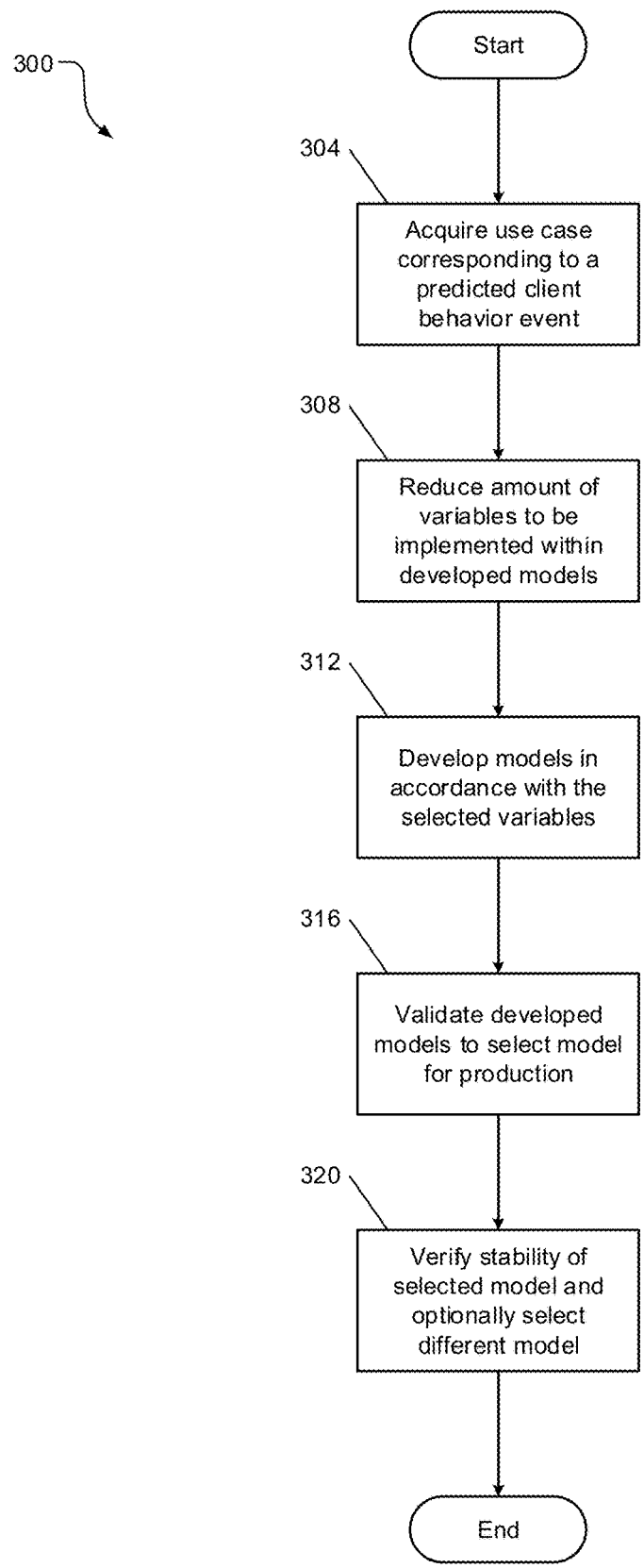
FIG. 3 illustrates steps of an example method for developing and validating models for predicting client behavior according to the principles of the present disclosure.

Referring now to FIG. 3, a method 300 for developing and validating models for predicting client behavior according to the principles of the present disclosure is shown. At 304, the method 300 acquires a use case corresponding to a predicted client behavior event. For example only, the use case may correspond to a prediction of a client behavior event such as a prediction of client attrition (i.e., a prediction of whether a particular client will stop using the services of a financial investment system). The acquired use case may correspond to data input using the user device 204 and provided to the model development system 208.

At 308, the method 300 reduces the amount of variables to be implemented within models for the use case. In other words, a subset (e.g., hundreds) of variables that are most relevant to the use case are identified and selected from thousands or tens of thousands of variables. Selected variables may include, but are not limited to, client behavior such as number of trades, types of trades, frequency of trades, dates of trades, etc.

The development module 248 executes a plurality of variable selection algorithms, such as one or more machine learning algorithms applied to the raw client data stored in the data stack 216. The variable selection algorithms include, but are not limited to, algorithms configured to identify variables predictive of a selected client behavior event based on bivariate analysis, correlation analysis, feature importance or feature selection analysis, and principal component regression (PCR) analysis. Output results of the variable selection algorithms may include a selected subset of variables.

For example only, the development module 248 executes the variable selection algorithms for the client behavior event in response to a request from the user device 204. For example, a user may input information corresponding to the client behavior event using the user interface 220. The information may include, for example, the selection of a variable or output value that represents the client behavior event. The development module 248 may provide outputs results of the variable selection algorithms to the user device 204. For example, the output results may include a report of the selected variables.

At 312, models (e.g., a plurality of predictive models for the client behavior event) are developed, in accordance with the selected variables, using the model development system 208. For example, one or more users may develop the models by accessing the model development system 208 using respective ones of the user devices 204. The models developed for a particular use case may include a plurality of different model types. The models may include, but are not limited to, gradient booster models, light gradient booster models, extreme gradient booster models, additive booster models, neural networks, random forest models, elastic net models, stochastic gradient descent models, support vector machine (SVM) models, etc. Each of the models is configured to predict the client behavior event using the select variables.

At 316, the method 300 validates developed models to determine the accuracy of respective models. For example, each model may be validated using cross-validation techniques including, but not limited to, k-fold cross-validation. For example, each model is executed to determine the lift of the model relative to the natural rate of the behavior event. The developed model having the greatest lift may be selected and implemented as the production model. Conversely, the remaining (i.e., non-selected) models may be discarded and/or modified. For example, the remaining models may be modified to operate in accordance with only the variables used by the selected production model.

The model validation system 212 may be configured to automatically validate the developed models (including a current selected production model and non-selected models). For example, the model validation system 212 may automatically (e.g., periodically, in response to updates to the client data stored in the data stack 216, etc.) execute model validation software corresponding to various cross-validation techniques as described above. In other examples, the model validation system 212 may validate all or selected ones of the developed models in response to inputs received at the user device 204.

At 320, the method 300 verifies the stability of the selected production model. For example, the method 300 verifies whether the actual performance of the production model achieves the lift (or, a predetermined lift) for the model as previously determined by the model validation system 212. In some examples, the model validation system 212 may be further configured to apply an algorithm (e.g., the model validation software) to the selected production model using subsequently generated client data to verify that the performance of the model corresponds to the predicted lift of the model. In other words, the model may have been developed and validated, prior to selecting the model, using previously acquired client data. Accordingly, the actual performance of the model using subsequent client data (i.e., data that is acquired after the model is selected as the production model) may be verified to confirm that the previously calculated lift corresponds to the actual lift.

For example only, the model validation system 212 may verify the stability of the model automatically (e.g., periodically, in response to updates to the client data stored in the data stack 216, etc.). Similarly, the model validation system 212 may continue to automatically validate other (i.e., non-selected) developed models using the newly-acquired client data. In some examples, as client data is acquired, the client data corresponding to the variables used by the selected model is provided to the model validation system 212 in real-time for continuous verification of the selected model.

The model validation system 212 may optionally select a different model based on the stability of the production model. For example, the model validation system 212 may select a different model in response to the lift of the selected model decreasing below a threshold a predetermined number of times, in response to an average lift of the selected model over a given period decreasing below a threshold, a lift of one of the non-selected models increasing above the lift of the selected model, etc. In this manner, the model validation system 212 selects the model having the most accurate prediction of the client behavior event as additional client data is acquired.

Figure 4:
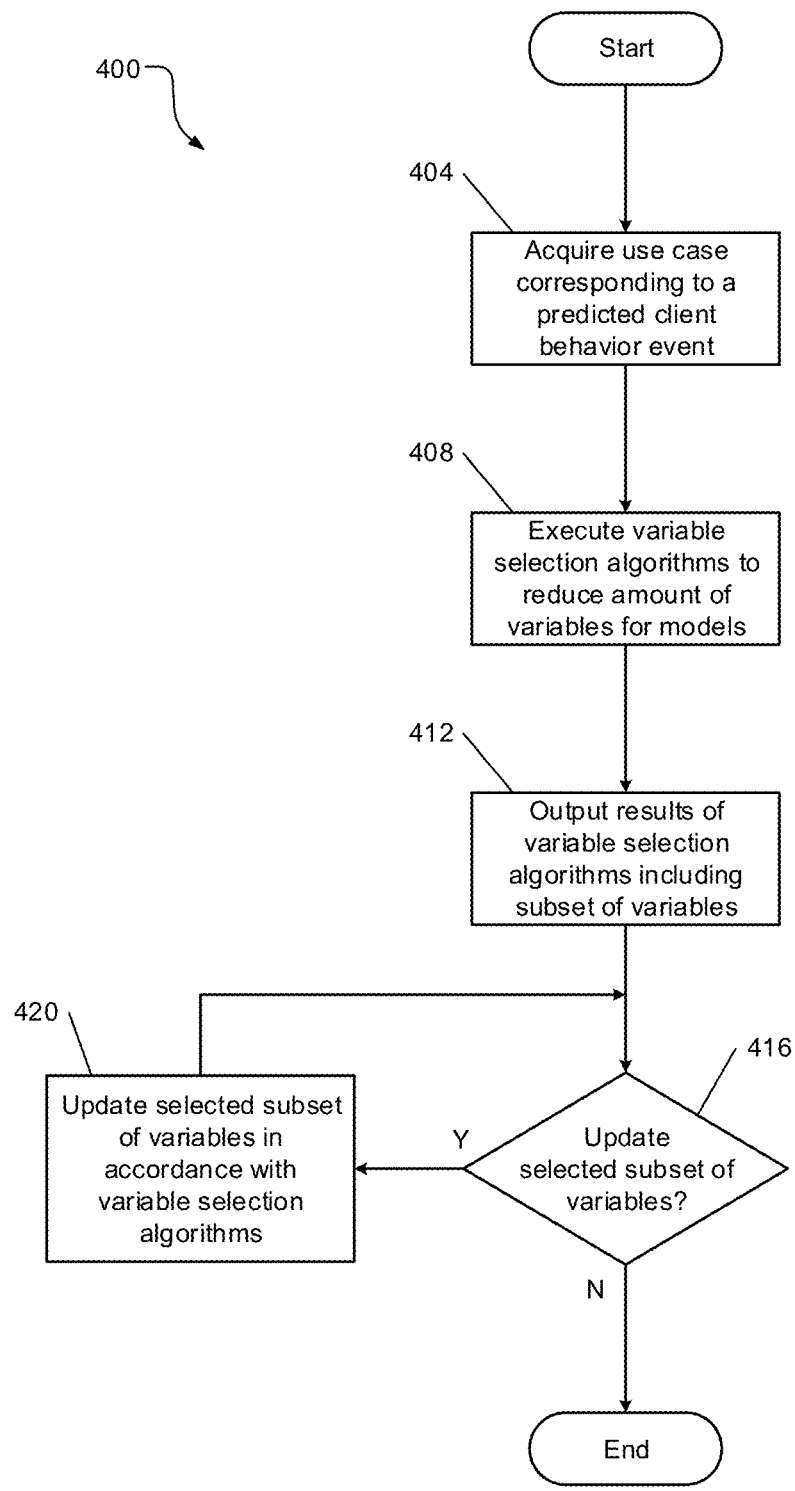
FIG. 4 illustrates steps of an example method for selecting and reducing an amount of variables to be used in a predictive model according to the principles of the present disclosure.

Referring now to FIG. 4, a method 400 for selecting and reducing an amount of variables to be used in a predictive model according to the principles of the present disclosure is shown. At 404, the method 400 acquires a use case corresponding to a predicted client behavior event. The acquired use case may correspond to data input using the user device 204 and provided to the model development system 208. At 408, the method 400 (e.g., the development module 248) executes a plurality of variable selection algorithms, such as one or more machine learning algorithms applied to the raw client data stored in the data stack 216. At 412, the method 400 outputs results of the variable selection algorithms. For example, the development module 248 generates a report of a selected subset of variables and outputs the report to the user device 204.

At 416, the method 400 determines whether to update the selected subset of variables. For example, the method 400 may selectively add or remove variables from the selected subset in response to input from a user received at the user device 204. In other examples, a variable may be added to (or removed from) the selected subset in response to a later determination that the variable is correlated to (or not correlated to) the client behavior. For example, the method 400 may periodically execute the variable selection algorithms as new client data is acquired to update the selected subset of variables. If true, the method 400 continues to 420 to update the selected subset of variables. Updating the selected subset of variables may include updating the algorithms that use those variables in any previous steps, such as the algorithms executed at 408 and 412. Further, steps 312, 316, and/or 320 may be re-executed in accordance with the updated variables. If false, the method 400 may continue to determine whether to update the selected subset of variables or end.

Figure 5:
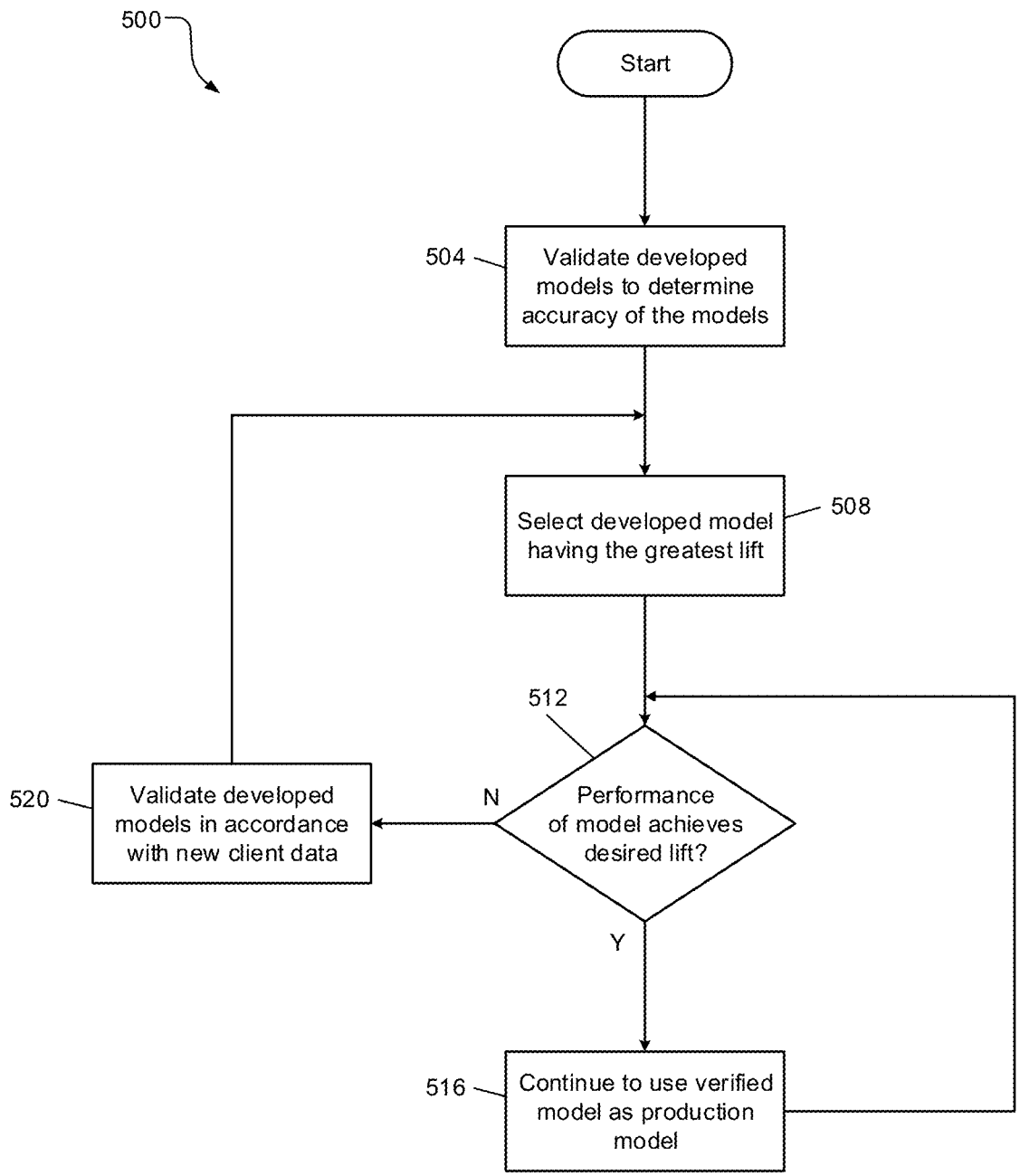
FIG. 5 illustrates steps of an example method for validating and verifying models for predicting client behavior according to the principles of the present disclosure.

Referring now to FIG. 5, a method 500 for validating and verifying models for predicting client behavior according to the principles of the present disclosure is shown. At 504, the method 500 validates developed models to determine the accuracy of respective models previously developed and stored (e.g., in the data stack 216) by users to determine which model to select as a production model as described above in FIG. 3. For example, each model may be validated using various cross-validation techniques to determine the lift of the model relative to the natural rate of the behavior event. At 508, the method 500 selects the developed model having the greatest lift to be implemented as the production model.

At 512, the method 500 verifies the stability of the selected production model. For example, the method 500 determines whether the actual performance of the production model (i.e., an actual lift of the model) achieves a desired lift in accordance with new client data that is acquired subsequent to the selection of the model as the production model as described above in FIG. 3. If true, the method 500 continues to 516. If false, the method 500 continues to 520. At 516, the method 500 continues to use the verified model as the production model.

At 520, the method 500 selectively validates the developed models (including both the selected model and the non-selected models) in accordance with the new client data. The method 500 may also verify the stability of the selected production model. In various implementations, the method 500 verifies the stability of the model automatically in response to updates to client data. As described above with respect to 320, the method 500 may optionally select a different model based on the stability of the production model.

Control then continues to 508 to select developed model as the production model. In other words, the method 500 may continue to compare the performance of all developed models to select the model having the greatest accuracy (e.g., the greatest lift based on incoming, updated client data).

Figure 6A:
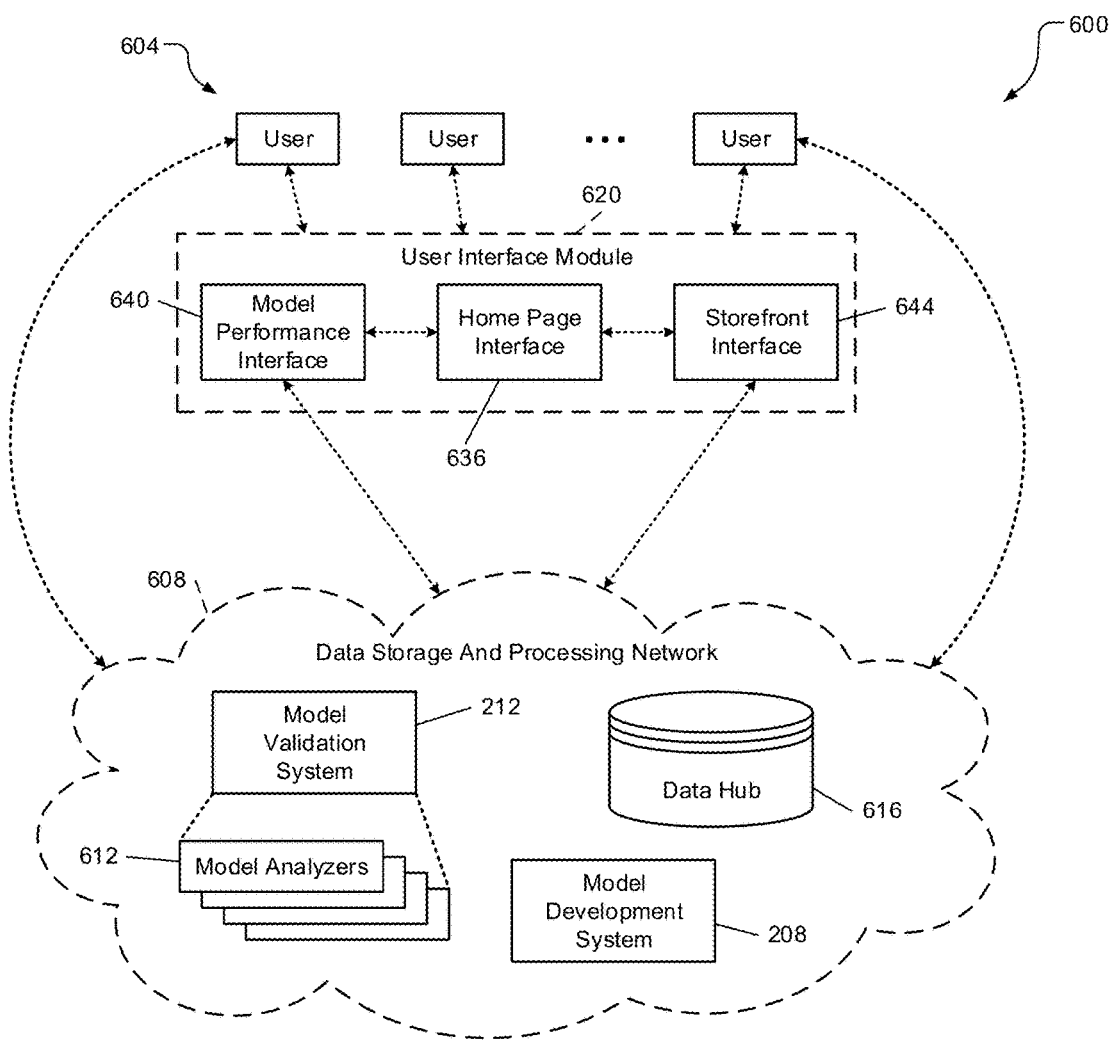
FIG. 6A is a block diagram of an example model management system according to the principles of the present disclosure.
Figure 6B:
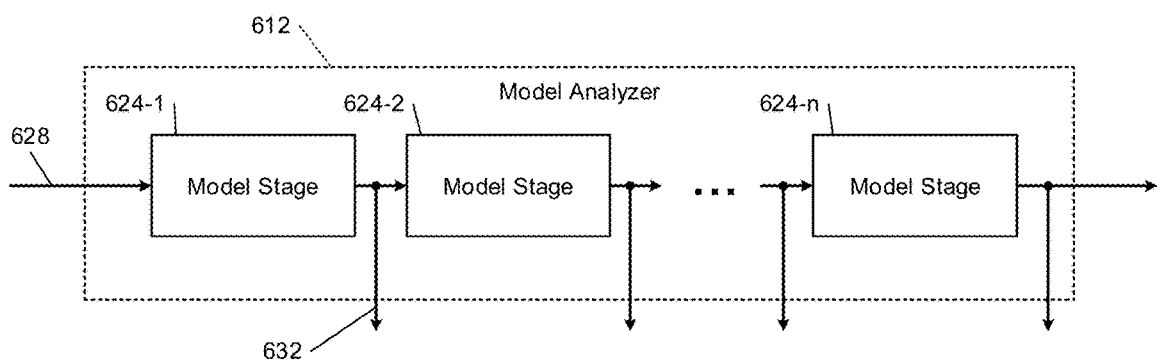
FIG. 6B is a block diagram of an example model analyzer according to the principles of the present disclosure.

Referring now to FIGS. 6A and 6B, an example model management system 600 according to the present disclosure is shown. The model management system 600 facilitates interaction between users 604 and models and validation data in a data storage and processing network 608 ("processing network" 608). For example, the processing network 608 includes components related to the system 200 described above in FIGS. 1-5, including, but not limited to, the model development system 208, the model validation system 212 (e.g., implementing one or more model analyzers 612), and a data hub 616. The data hub 616 may correspond to one or multiple storage locations such as the data stack 216 and may be implemented as one or more servers, a cloud computing system, databases or data warehouse appliances, etc. In other words, the data hub 616 may include centralized or distributed data storage and combinations thereof.

Similarly, the model development system 208 and the model validation system 212 may be stored and/or implemented within a same or different computing device, server, components of a cloud computing system, the data hub 616, etc. All or portions of the model development system 208 and the model validation system 212 may be executed using user devices corresponding to the users 604.

For example, the model management system 600 implements a user interface module 620 that provides access to the network 608 (i.e., access to models and validation data including, but not limited to, model inputs, outputs, variables, scores, anomalies, etc. stored and/or generated by the network 608) as described below in more detail. Some users (e.g., customers) may only be permitted to access selected information about respective models generated by and stored in the network 608 via the user interface module 620. Conversely, other users (e.g., developers) may access the network 608 via the user interface module 620 and/or directly (e.g., via the user device 204 as described above).

The model validation system 212 is configured to execute the one or more model analyzers 612 (e.g., using the validation module 260 as described above in FIGS. 2-5) to analyze development and production models. For example, the model validation system 212 automatically (e.g., periodically, in response to updates to the client data, etc.) analyzes developed models using available data, including both historical data and newly received or update data.

FIG. 6B shows an example one of the model analyzers 612 including a plurality of model stages 624-1, 624-2, . . . , and 624-n, referred to collectively as model stages 624. For example, the model stages 624 correspond to respective steps of an algorithm executed by the model analyzer 612 (e.g., model validation software) to validate individual models as described above in FIGS. 2-5. Respective stages 624 may correspond to, for example only, a client behavior stage, an algorithm execution stage, an output storing stage (e.g., a stage for storing outputs of the model validation system 212), etc. For example only, the model stages 624 are executed using a software package or container (e.g., a Docker container). Each of the stages 624 has a different set of code (e.g., a code base stored and accessible in the data hub 616) to be executed by the model analyzer 612.

The model analyzer 612 receives one or more inputs 628 including, but not limited to, client data and variables (e.g., historical and updated raw data) and executes code corresponding to the respective stage 624. For example only, each of the model analyzers 612 may validate and/or verify the stability of models automatically (e.g., periodically and/or in response to updates to the client data,), in response to user requests, continuously, etc.

The model validation system 212 according to the present disclosure is configured to analyze and validate models at each of the stages 624 based on the inputs 628 and results of preceding ones of the stages 624. For example, each stage 624 receives one input or set of inputs and generates one output. As shown, the model stage 624-1 receives the inputs 628 and subsequent stages 624-1 through 624-n receive an output 632 of a preceding one of the stages 624. In other words, each output 632 corresponds to a result of a single step of the algorithm as executed by the respective stage 624 of the model analyzer 612. Each of the outputs 632 can be independently scored and rating, compared on a distribution shift relative to other outputs, compared to a predetermined threshold, etc. The respective output 632 of each of the stages 624 is provided to a next one of the stages 624 and output from the analyzer 612. For example, the outputs 632 are provided to the data hub 616. Accordingly, the results of each stage 624 of the model being analyzed can be independently stored and verified. The outputs 632 may be provided as tables, files, etc.

The model validation system 212 validates the model upon the completion of each of the stages 624 based on the respective outputs 632. In some examples, each stage 624 may have a corresponding validation threshold. The model validation system 212 calculates a score for each output 632 and determines whether the score exceeds the validation threshold. The model validation system 212 may also determine whether execution of the model failed based on each of the outputs 632. For example, each output 632 may have an expected range of values and if the output 632 is not within the expected range, the model validation system 212 determines that the model failed at the corresponding stage 624.

In this manner, the model validation system 212 is configured to provide information about the results of each stage 624 of the model. For example, the model validation system 212 generates model data (including the outputs 632 as well as metadata for each of the stages 624). For example only, the metadata includes results and scoring for each of the stages 624, respective variables used in the calculations in each of the stages 624, statistics, etc. The metadata is provided to and stored in the data hub 616 and is selectively accessible via the user interface module 620 as described below in more detail.

Each time a model is validated, the model validation system 212 is configured to consecutively execute each of the model stages 624 and output the respective outputs 632 and corresponding metadata from the stage 624-1 through the stage 624-n. In particular, the model validation system 212 may execute each of the model stages 624 without additional prompting or input from a user. Each of the outputs 632 and corresponding metadata (e.g., data including, but not limited to, tables, statistics, etc.) generated by the model validation system 212 is stored in the data hub 616. For example, the data is stored as output tables in the data hub 616.

In some examples, the model validation system 212 may halt or pause validation in response to an output 632 indicating that the model has failed. For example, the model validation system 212 may determine that a particular output 632 indicates that the model has failed to meet a validation threshold. In response, the model validation system 212 may halt validation, flag the stage 624 that generated the output 632 (i.e., generate metadata for the output 632 indicating that the corresponding stage failed), and generate a notification or alert to be provided to users. The notification includes, for example, indications of which variable input to the stage 624 failed: for example, the variable input did not provide a result, such as a distribution shift, within a desirable range; as another example, the input variable indicated another anomaly, such as a calculated population stability index exceeding a predetermined threshold. The notification may also indicate in which of the stages 624 the variable failed. For example only, the notifications are provided via email or other electronic communication to selected users. In response, one or more of the selected users may cause (e.g., via inputs at the user interface module 620) the model validation system 212 to continue with a next one of the stages 624, re-execute the failed one of the stages 624, etc.

The model validation system 212 may re-execute selected ones of the stages 624 in response to the user request and/or automatically (i.e., upon detecting a failure in one of the stages 624). In other words, if one of the stages 624 fails, the model validation system 212 does not need to re-execute the entire model analyzer 612 and instead can execute the failed one of the stages 624 or selected ones of the stages 624 in response to a user request. For example, in response to a notification that a particular stage 624 failed, a user can transmit a request to the model validation system 212 to re-execute the failed stage 624. Since code corresponding to each of the stages 624 is stored in a separate container as described above, the code corresponding to each of the stages 624 can be independently executed. Further, users can separately modify the code corresponding to respective stages 624 by accessing a desired container (e.g., as stored in the data hub 616).

The user interface module 620 includes a home page interface 636, a model performance interface 640, and a storefront interface 644. The home page interface 636, the model performance interface 640, and the storefront interface 644 correspond to graphical user interfaces (GUIs). All or portions of the home page interface 636, the model performance interface 640, and the storefront interface 644 may be stored and executed remotely (e.g., within the data storage and processing network 608). The users 604 use the home page interface 636 to selectively access model data stored in the network 608 via the storefront interface 644 and/or the model performance interface 640.

Some of the users 604 (e.g., customers) may only be permitted to access selected model data stored in the network 608 via the storefront interface 644. For example, customers may access the storefront interface 644 in accordance with a subscription (e.g., as indicated in the input user credentials) to view an inventory of available models and performance/scoring of available models (e.g., even rates, lead quantity, lift over time, etc.). For example, users may subscribe to specific data, such as leads for a particular model. Conversely, others of the users 604 (e.g., developers) may access the network 608 via the storefront interface 644, the model performance interface 640, and/or directly (e.g., via the user device 204 as described above). Developers may access the model performance interface 640 to view model performance data, execute models, modify models, etc. The users 604 may further adjust parameters and variables of models to determine model performance for specific variables, subsets of data points, selected date ranges, etc.

The users 604 input credentials (e.g., username, password, etc.) at the home page interface 636 and are selectively provided access to the network 608 via the model performance interface 640 and/or the storefront interface 644. Different model data in the network 608 is available to the corresponding user 604 based on which access mechanism (i.e., the model performance interface 640 or the storefront interface 644) is used to access the network 608. For example, model data accessible via the model performance interface 640 and model data accessible via the storefront interface 644 are separately stored in the network 608 (e.g., as a first set of model data and a second set of model data). Some model data may be accessible via both the model performance interface 640 and the storefront interface 644. The model data accessible to the model performance interface 640 may be referred to as development data. Conversely, the model data accessible to the storefront interface 644 may be referred to as storefront data. Generally, the storefront data may correspond to a limited subset of the development data.

As described above, the model validation system 212 provides model data including the respective outputs 632 and corresponding metadata from each of the stages 624 of the model analyzers 612 to the data hub. The model data includes, but is not limited to, scores, output tables, statistics, etc. generated by the model validation system 212. The model data may include visual data (e.g., graphs, charts, etc.) representing model performance.

The model data may be automatically updated manually (e.g., responsive to a command from a user) and/or periodically (e.g., daily, weekly, etc.). To update the model data, the model validation system 212 retrieves historical and updated output data (e.g., outputs of the model analyzers 612 since a previous update), populates output tables based on the output data (including outputs of respective ones of the stages 624), and updates model data available to the users 604 based on the output tables. For example, the model validation system 212 transforms the output data into a format for presentation to the users 604, which may include generating graphs and other visual representations of the output data to be stored in the data hub 616.

Figure 7:
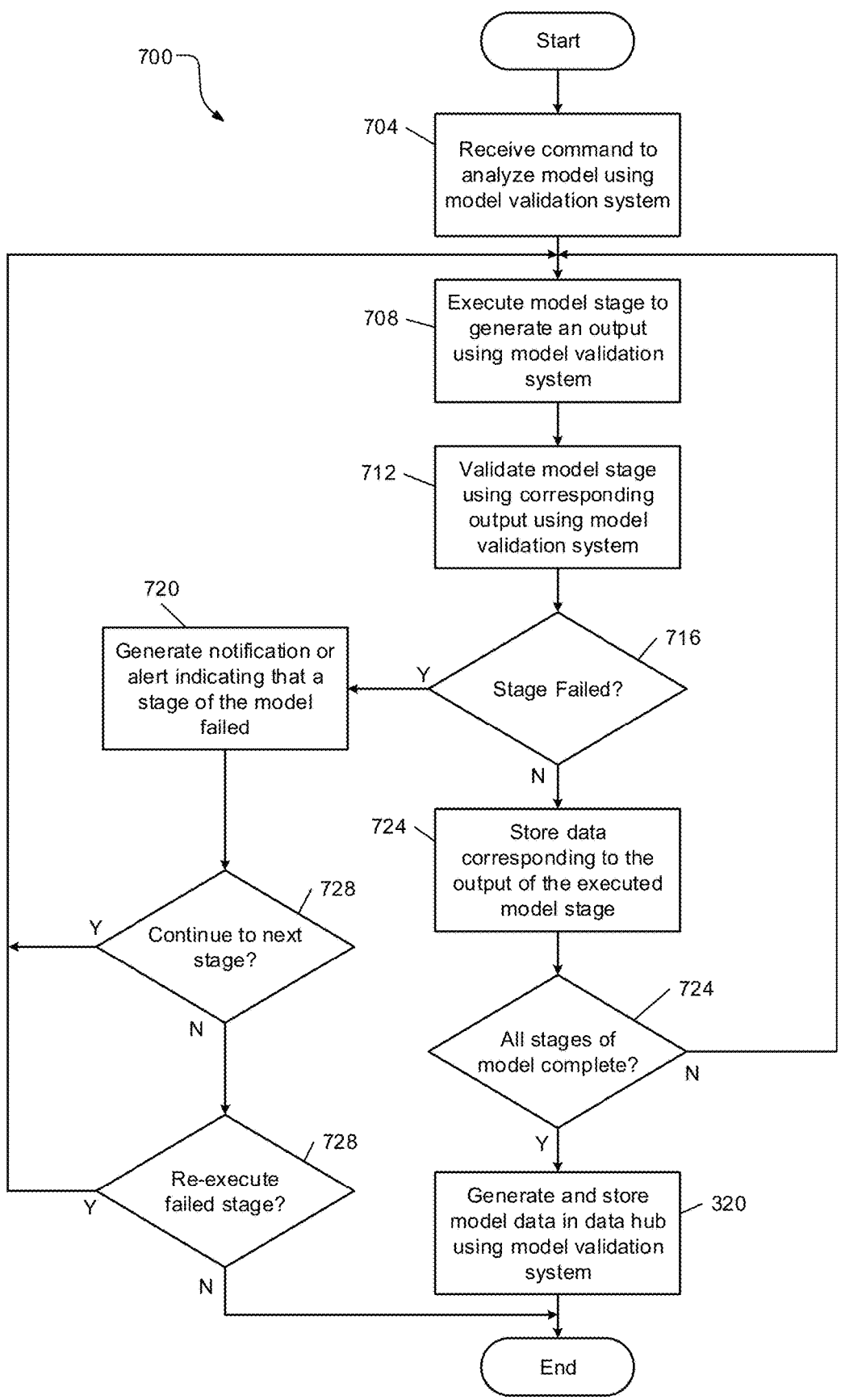
FIG. 7 illustrates steps of an example method for executing stages of a model analyzer according to the principles of the present disclosure.

Referring now to FIG. 7, an example method 700 for executing stages of a model analyzer is shown. At 704, the method 700 (e.g., the model validation system 212) receives a command to analyze one or more stored models. For example, the model validation system 212 may validate models using the model analyzers 612 periodically, conditionally, in response to a command from a user, etc. At 708, the method 700 (e.g., the model validation system 212) executes a stage of the model (e.g., a model stage 624) to generate an output for that stage. At 712, the method 700 (e.g., the model validation system 212) validates the executed model stage. For example, the method 700 evaluates an output of the stage by comparing the output to a threshold, an expected range, etc.

At 716, the method 700 (e.g., the model validation system 212) determines whether the execution of the model failed based on the output of the executed stage. If true, the method 700 continues to 720. If false, the method 700 continues to 724. At 720, the method 700 (e.g., the model validation system 212) generates a notification or alert that the stage of the model failed. For example, the model validation system 212 generates and transmits the notification to selected users via email or other electronic communication. At 728, the method 700 (e.g., the model validation system 212) determines whether to continue to a next stage of the model. For example, the method 700 may continue with the next stage of the model in response to a command from a user. If true, the method 700 continues to 708 to execute the next stage of the model. If false, the method 700 continues to 732.

At 732, the method 700 (e.g., the model validation system 212) determines whether to re-execute the failed stage. For example, the method 700 selectively re-executes the failed stage in response to a command from a user. If true, the method 700 continues to 708 to re-execute the failed stage. If false, the method 700 ends.

At 724, the method 700 stores data corresponding to the output of the executed model stage (e.g., in the data hub 616). For example, the data is stored as one or more output tables. At 736, the method 700 (e.g., the model validation system 212) determines whether all stages of the model have been executed (i.e., whether analyzation of the model is complete). If true, the method 700 continues to 740. If false, the method 700 continues to 708 to execute a next model stage. At 740, the method 700 (e.g., the model validation system 212) updates model data based on the results of the executed model. For example, the method 700 generates and stores model data (e.g., in the data hub 616) using the stored outputs of the respective stages of the model, including generating graphs or other visual representations of data stored in output tables. The method 700 ends after the model data has been updated.

Figure 8A:
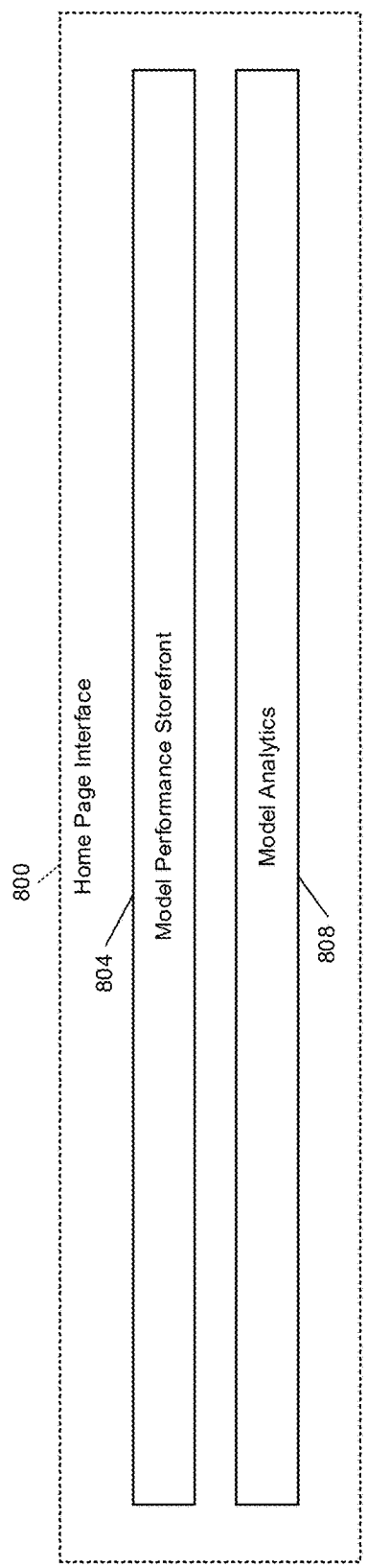
FIGS. 8A-8D are example pages of a user interface module according to the principles of the present disclosure.

FIG. 8A shows an example home page interface 800 (e.g., corresponding to the home page interface 636) according to the present disclosure. For example, the home page interface 800 is a GUI displayed on a screen of a user device. The home page interface 800 includes a model performance storefront button 804 (e.g., corresponding to a machine learning storefront) and a model analytics button 808 (e.g., corresponding to a performance dashboard) corresponding to the storefront interface 644 and the model performance interface 640, respectively. A user may select one of the buttons 804 and 808 and is then prompted to input user credentials accordingly. In other examples, user credentials may be provided prior to reaching the home page interface 800 and only buttons corresponding to allowed data are provided.

Figure 8B:
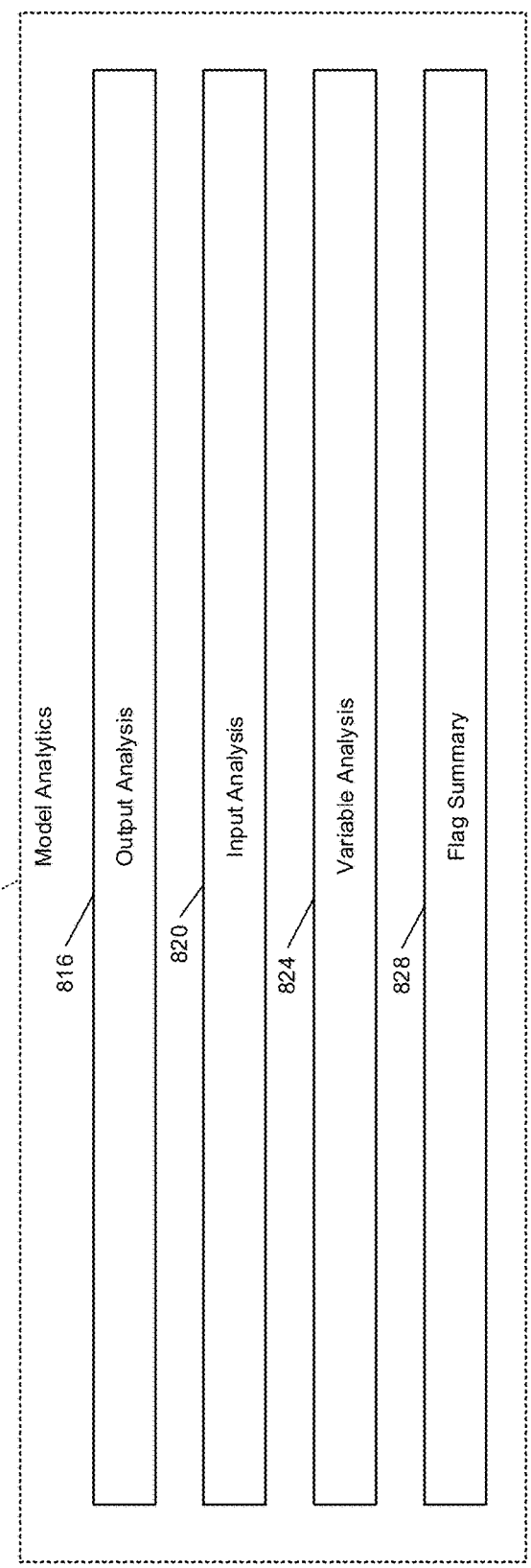

FIG. 8B shows an example model performance interface 812 that is accessed in response to the user selecting the model analytics button 808. For example, the model performance interface 812 includes buttons 816, 820, 824, and 828 for accessing model data corresponding to output analysis, input analysis, variable analysis, and flag summary model data, respectively. Accordingly, the user may select one of the buttons 816, 820, 824, and 828 to view output analysis model data, input analysis model data, variable analysis model data, and flag summary model data.

For example only, output analysis model data may include, but is not limited to, prediction values (i.e., scores) for outputs of selected models. The prediction values may correspond to a distribution shift as described above. For example, the user may select a desired model and a specific time period to view model data showing the prediction value of an output in the specified time period, changes in the prediction value over time, etc. Input analysis model data may include relative values (e.g., scores) of input variables used in a selected model over time. Variable analysis model data shows changes in scores of a selected variable (e.g., over a specified time period).

Flag summary model data includes data identifying variables and/or model stages of a selected model that have caused the model validation system 212 to generate a notification or alert in a specified time period. For example, the flag summary model data may include a list of variables that generated an alert, a number of times a variable generated an alert, an increase or decrease in a score of a variable, etc.

Figure 8C:
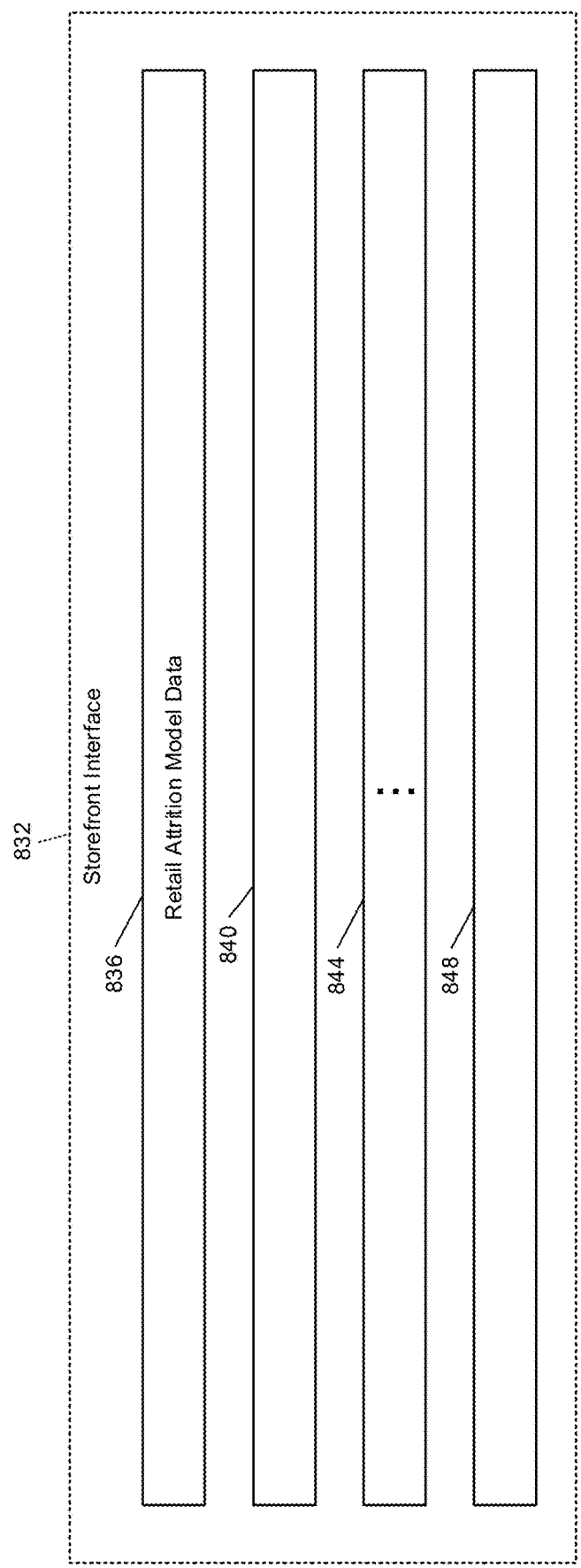
Figure 8D:
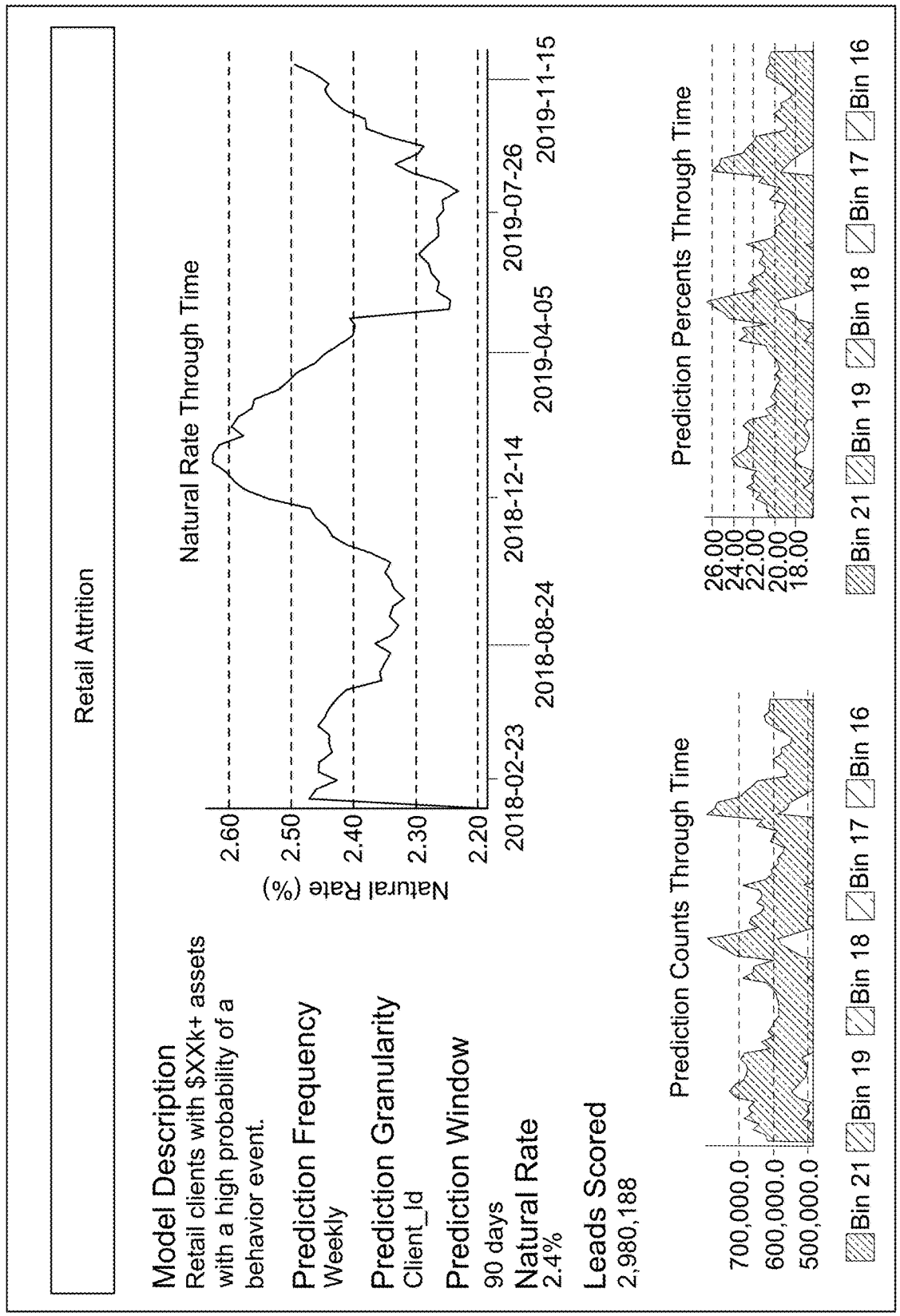

FIG. 8C shows an example storefront interface 832 that is accessed in response to the user selecting the model performance storefront button 804. For example, the model performance interface 812 includes a plurality of buttons 836, 840, 844, . . . , and 848 corresponding to different model data (e.g., corresponding to different selected models) available to users via the storefront interface 832. For example only, the button 836 can be selected to provide model data corresponding to a retail attrition model. Example model data corresponding to retail attrition model data is shown in FIG. 8D. For example, the model data may include, but is not limited to, a brief description of the model, prediction frequency, prediction granularity, a prediction window (e.g., a selectable time period), a natural rate of modeled behavior, and a number of leads. As shown in FIG. 8D, the model data may include a graph of a change in the natural rate over time.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A. The term subset does not necessarily require a proper subset. In other words, a first subset of a first set may be coextensive with (equal to) the first set.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are the BLUETOOTH wireless networking standard from the Bluetooth Special Interest Group and IEEE Standard 802.15.4.

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A model management system for validating models for predicting a client behavior event, the model management system comprising:
a memory having computer readable instructions stored thereon;
at least one processor configured to execute the computer readable instructions to cause the model management system to
select a model of a plurality of models to validate with a model analyzer, the model analyzer including a plurality of sequential stages, the plurality of sequential stages including at least a client behavior stage, an algorithm execution stage, and an output storing stage, each of the plurality of sequential stages having code that is stored in separate containers and executed independently,
separately modify the code corresponding to respective stages of the plurality of sequential stages by accessing a desired container of the separate containers,
input client data and a plurality of variables into a first stage of the plurality of sequential stages,
execute each of the plurality of sequential stages of the model analyzer, wherein executing each of the plurality of sequential stages includes calculating a respective output based on a respective input of each of the plurality of sequential stages, wherein the respective outputs of each of the plurality of sequential stages are provided as the respective inputs to stages subsequent to the first stage of the plurality of sequential stages, separately verify, based on the respective outputs, each of the plurality of sequential stages by comparing the respective outputs to at least one of a corresponding threshold or range of values, wherein the comparing the respective outputs to at least one of the corresponding threshold or the range of values for each stage of the plurality of sequential stages indicates whether the model failed at the respective stage of the plurality of sequential stages, selectively stop executing the plurality of sequential stages of the model analyzer based on the comparing the respective outputs to at least one of the corresponding threshold or the range of values indicating the model failed at the respective stage of the plurality of sequential stages, re-execute the respective stage of the plurality of sequential stages in response to receiving a request to re-execute the respective stage of the plurality of sequential stages via a user interface, and generate and store model data corresponding to the respective outputs of each of the plurality of sequential stages and metadata of each of the plurality of sequential stages, wherein the model data includes a first set of model data corresponding to the outputs of each of the plurality of sequential stages and a second set of model data different from the first set of model data, wherein the second set of model data is a subset of the first set of model data, and wherein the metadata includes at least one of results, scoring, or variables used in calculations for each of the plurality of sequential stages; and the user interface configured to
receive an indication of credentials of a user,
selectively retrieve and output either the first set of model data or the second set of model data based on the indication, and
adjust a display based on a time period selected by the user to output at least a graph of a change in a natural rate over time for the first set of model data or the second set of model data for the selected time period.

2. The model management system of claim 1, wherein the at least one processor is configured to execute the computer readable instructions to cause the model management system to generate and transmit a notification in response to the comparing the respective outputs to at least one of the corresponding threshold or the range of values.

3. The model management system of claim 2, wherein the notification identifies a variable used in a respective one of the plurality of sequential stages.

4. The model management system of claim 1, wherein the first set of model data is accessible, via the user interface, to a first set of users and the second set of model data is accessible, via the user interface, to a second set of users.

5. The model management system of claim 1, wherein the at least one processor is configured to execute the computer readable instructions to cause the model management system to store output tables including data indicative of the respective outputs of each of the plurality of sequential stages.

6. The model management system of claim 5, wherein the at least one processor is configured to execute the computer readable instructions to cause the model management system to update the model data using the data in the output tables.

7. The model management system of claim 6, wherein the model data includes a visual representation of the data in the output tables.

8. The model management system of claim 1, wherein the user interface is configured to selectively display one of a model performance interface accessible by a first set of users and a storefront interface accessible by a second set of users.

9. A method for validating models for predicting a client behavior event, the method comprising:
selecting a model of a plurality of models to validate with a model analyzer, the model analyzer including a plurality of sequential stages, the plurality of sequential stages including at least a client behavior stage, an algorithm execution stage, and an output storing stage, each of the plurality of sequential stages having code that is stored in separate containers and executed independently;
separately modifying the code corresponding to respective stages of the plurality of sequential stages by accessing a desired container of the separate containers;
inputting client data and a plurality of variables into a first stage of the plurality of sequential stages;
executing each of the plurality of sequential stages of the model analyzer, wherein executing each of the plurality of sequential stages includes calculating a respective output based on a respective input of each of the plurality of sequential stages, wherein the respective outputs of each of the plurality of sequential stages are provided as the respective inputs to stages subsequent to the first stage of the plurality of sequential stages;
separately verifying, based on the respective outputs, each of the plurality of sequential stages by comparing the respective outputs to at least one of a corresponding threshold or range of values, wherein the comparing the respective outputs to at least one of the corresponding threshold or the range of values for each stage of the plurality of sequential stages indicates whether the model failed at the respective stage of the plurality of sequential stages;
selectively stopping the executing of the plurality of sequential stages of the model analyzer based on the comparing the respective outputs to at least one of the corresponding threshold or the range of values indicating the model failed at the respective stage of the plurality of sequential stages;
re-executing the respective stage of the plurality of sequential stages in response to receiving a request to re-execute the respective stage of the plurality of sequential stages via a user interface;
generating and storing model data corresponding to the respective outputs of each of the plurality of sequential stages and metadata of each of the plurality of sequential stages, wherein the model data includes a first set of model data corresponding to the outputs of each of the plurality of sequential stages and a second set of model data different from the first set of model data, wherein the second set of model data is a subset of the first set of model data, and wherein the metadata includes at least one of results, scoring, or variables used in calculations for each of the plurality of sequential stages;
receiving an indication of credentials of a user;
selectively retrieving and displaying on the user interface either the first set of model data or the second set of model data based on the indication; and
adjusting the user interface based on a time period selected by the user to display at least a graph of a change in a natural rate over time for the first set of model data or the second set of model data for the selected time period.

10. The method of claim 9, further comprising generating and transmitting a notification in response to the comparing the respective outputs to at least one of the corresponding threshold or the range of values.

11. The method of claim 10, wherein the notification identifies a variable used in a respective one of the plurality of sequential stages.

12. The method of claim 9, wherein the first set of model data is accessible, via a user interface module, to a first set of users and the second set of model data is accessible, via a user interface module, to a second set of users.

13. The method of claim 9, further comprising storing output tables including data indicative of the respective outputs of each of the plurality of sequential stages.

14. The method of claim 13, further comprising updating the model data based on the output tables.

15. A method for validating models for predicting a client behavior event, the method comprising:

selecting a model of a plurality of models to validate with a model analyzer, the model analyzer including a plurality of sequential stages, the plurality of sequential stages including at least a client behavior stage, an algorithm execution stage, and an output storing stage, each of the plurality of sequential stages having code that is stored in separate containers and executed independently;

separately modifying the code corresponding to respective stages of the plurality of sequential stages by accessing a desired container of the separate containers;

inputting client data and a plurality of variables into a first stage of the plurality of sequential stages;

executing each of a plurality of sequential stages of the model analyzer, wherein executing each of the plurality of sequential stages includes calculating a respective output based on a respective input of each of the plurality of sequential stages, wherein the respective outputs of each of the plurality of sequential stages are provided as the respective inputs to stages subsequent to the first stage of the plurality of sequential stages, separately verifying, based on the respective outputs, each of the plurality of sequential stages by comparing the respective outputs to at least one of a corresponding threshold or range of values, wherein the comparing the respective outputs to at least one of the corresponding threshold or the range of values for each stage of the plurality of sequential stages indicates whether the model failed at the respective stage of the plurality of sequential stages;

selectively stopping the executing of the plurality of sequential stages of the model analyzer based on the comparing the respective outputs to at least one of the corresponding threshold or the range of values indicating the model failed at the respective stage of the plurality of sequential stages;

re-executing the respective stage of the plurality of sequential stages in response to receiving a request to re-execute the respective stage of the plurality of sequential stages via a user interface;

generating and storing model data in output tables, the model data corresponding to the respective outputs of each of the plurality of sequential stages;

generating and storing metadata of each of the plurality of sequential stages, the metadata including at least one of results, scoring, or variables used in calculations for each of the plurality of sequential stages;

automatically updating the model data;

outputting the model data to the user interface based on an indication of credentials of a user; and adjusting the user interface based on a time period selected by a user to display at least a graph of a change in a natural rate over time for the model data for the selected time period.

16. The method of claim 15, wherein the automatically updating the model data includes retrieving historical data of the model analyzer and any outputs of the model analyzer since a previous update of the model data.

* * * * *